(12) United States Patent
Nazarian et al.

(10) Patent No.: US 10,940,081 B2
(45) Date of Patent: Mar. 9, 2021

(54) PERCUSSIVE MASSAGE DEVICE WITH FORCE METER

(71) Applicant: Theragun, Inc., Beverly Hills, CA (US)

(72) Inventors: Benjamin Nazarian, Beverly Hills, CA (US); Jason Wersland, Manhattan Beach, CA (US); Jaime Sanchez Solana, Los Angeles, CA (US); Eduardo Merino, Beverly Hills, CA (US); Richard Tang, Shenzhen (CN)

(73) Assignee: THERAGUN, INC., Beverly Hills, CA (US)

( * ) Notice: Subject to any disclaimer, the term of this patent is extended or adjusted under 35 U.S.C. 154(b) by 0 days.

(21) Appl. No.: 16/796,143

(22) Filed: Feb. 20, 2020

(65) Prior Publication Data

US 2020/0352820 A1 Nov. 12, 2020

Related U.S. Application Data

(60) Provisional application No. 62/844,424, filed on May 7, 2019, provisional application No. 62/899,098, filed (Continued)

(51) Int. Cl.
*A61H 23/00* (2006.01)
*H02P 29/40* (2016.01)
(Continued)

(52) U.S. Cl.
CPC ........... *A61H 23/006* (2013.01); *A61H 23/02* (2013.01); *A61H 23/0254* (2013.01);
(Continued)

(58) Field of Classification Search
CPC .......... A61H 1/00; A61H 1/006; A61H 1/008; A61H 23/00; A61H 23/004; A61H 23/006;
(Continued)

(56) References Cited

U.S. PATENT DOCUMENTS

| 3,172,675 A | 3/1965 | Gonzalez |
| 3,545,301 A | 12/1970 | Richter |

(Continued)

FOREIGN PATENT DOCUMENTS

| JP | 1990019157 | 1/1990 |
| JP | 1995051393 | 2/1995 |

(Continued)

OTHER PUBLICATIONS

PCT/US2016/038326 International Search Report & Written Opinion dated Sep. 1, 2016.

(Continued)

*Primary Examiner* — Colin W Stuart
(74) *Attorney, Agent, or Firm* — Jeffer Mangels Butler & Mitchell LLP; Brennan C. Swain, Esq.

(57) ABSTRACT

A percussive massage device with a force meter that includes a housing, an electrical source, a motor positioned in the housing, a switch for activating the motor, and a controller configured to obtain a voltage of the motor, generate a lookup table correlating voltage to force applied by the percussive massage device, and display a force magnitude corresponding to the obtained voltage using the lookup table.

20 Claims, 16 Drawing Sheets

Related U.S. Application Data on Sep. 11, 2019, provisional application No. 62/912,392, filed on Oct. 8, 2019.

(51) Int. Cl.
*H02K 7/14* (2006.01)
*H02K 11/26* (2016.01)
*H02K 11/00* (2016.01)
*A61H 23/02* (2006.01)
*G01L 5/00* (2006.01)

(52) U.S. Cl.
CPC ............ *G01L 5/0038* (2013.01); *H02K 7/145* (2013.01); *H02K 11/0094* (2013.01); *H02K 11/26* (2016.01); *H02P 29/40* (2016.02); *A61H 2201/5007* (2013.01); *A61H 2201/5043* (2013.01); *A61H 2201/5061* (2013.01)

(58) Field of Classification Search
CPC ............... A61H 23/02; A61H 23/0218; A61H 23/0254; A61H 23/0263; A61H 23/04; A61H 23/06; A61H 2023/002; A61H 2023/0209; A61H 2023/0272; A61H 2023/0281; A61H 2023/029; A61H 39/00; A61H 39/002; A61H 39/007; A61H 39/04; A61H 2201/0165; A61H 2201/12; A61H 2201/1207; A61H 2201/1215; A61H 2201/1223; A61H 2201/123; A61H 2201/1238; A61H 2201/14; A61H 2201/1409; A61H 2201/1418; A61H 2201/1481; A61H 2201/149; A61H 2201/1664; B23D 51/16; B23D 49/162; B23D 49/165; B23D 49/00; B23D 49/007; B23D 49/008; B23D 49/10; B23D 49/16; B23D 49/167; B26D 7/2621; B26D 7/2614; B26D 5/14; A61B 17/148; A61B 17/142; A61B 17/14; A61B 17/144; A61B 5/0048; A61B 5/0053; A61B 5/103; B27B 19/00; B27B 19/002; B27B 19/006; B27B 19/09; B27B 19/02; B27B 11/06; H02P 29/40; H02K 7/145; H02K 11/26; H02K 11/0094; G01L 5/0038
USPC .... 83/615, 623, 632, 626, 427; 30/392, 393, 30/394, 182, 208, 241, 217–220, 242; 173/49, 114, 122, 205; 227/131; D8/8, D8/61, 64; 144/121, 122, 147; 125/16.01; 76/31, 36; 601/97, 107
See application file for complete search history.

(56) References Cited

U.S. PATENT DOCUMENTS

| | | |
|---|---|---|
| 3,626,934 A | 12/1971 | Andis |
| 3,942,251 A | 3/1976 | Griffies |
| 4,150,668 A | 4/1979 | Johnston |
| 4,173,217 A | 11/1979 | Johnston |
| 4,549,535 A | 10/1985 | Wing |
| 4,566,442 A | 1/1986 | Mabuchi |
| 4,730,605 A | 3/1988 | Noble et al. |
| 5,085,207 A | 2/1992 | Fiore |
| 5,212,887 A | 5/1993 | Farmerie |
| 5,417,644 A | 5/1995 | Lee et al. |
| 5,569,168 A | 10/1996 | Hartwig |
| 5,573,500 A | 11/1996 | Katsunuma |
| 5,951,501 A | 9/1999 | Griner |
| 6,228,042 B1 | 5/2001 | Dungan |
| 6,663,657 B1 | 12/2003 | Miller |
| 6,682,496 B1 | 1/2004 | Pivaroff |
| 7,927,259 B1 | 4/2011 | Rix |
| 7,996,996 B2 | 8/2011 | Hirabayashi |
| 8,342,187 B2 | 1/2013 | Kalman |
| 8,951,216 B2 | 2/2015 | Yoo et al. |
| 10,314,762 B1 | 6/2019 | Marton |
| 2001/0016697 A1 | 8/2001 | Gorsen |
| 2003/0009116 A1 | 1/2003 | Luettgen |
| 2003/0094356 A1 | 5/2003 | Waldron |
| 2003/0144615 A1 | 7/2003 | Lin |
| 2003/0195443 A1 | 10/2003 | Miller |
| 2006/0025710 A1 | 2/2006 | Schulz |
| 2006/0123941 A1 | 6/2006 | Wadge |
| 2006/0192527 A1 | 8/2006 | Kageler |
| 2007/0144310 A1 | 6/2007 | Pozgay |
| 2007/0150004 A1 | 6/2007 | Colloca |
| 2008/0103419 A1 | 5/2008 | Adamson |
| 2011/0314677 A1* | 12/2011 | Meier ............... A46B 13/02 30/41.8 |
| 2012/0238922 A1* | 9/2012 | Stemple ............ A61H 31/005 601/41 |
| 2012/0253245 A1 | 10/2012 | Stanbridge |
| 2013/0133210 A1 | 5/2013 | Weir |
| 2013/0138023 A1 | 5/2013 | Lerro |
| 2013/0237751 A1 | 9/2013 | Alexander |
| 2013/0261516 A1 | 10/2013 | Cilea |
| 2013/0281897 A1 | 10/2013 | Hoffmann |
| 2014/0031866 A1* | 1/2014 | Fuhr .................. A61H 1/008 606/239 |
| 2014/0180331 A1 | 6/2014 | Turner |
| 2014/0316313 A1* | 10/2014 | Mayer ................ A43B 7/147 601/84 |
| 2015/0005682 A1 | 1/2015 | Danby |
| 2015/0148592 A1 | 5/2015 | Kanbar |
| 2015/0257964 A1 | 9/2015 | Ajiki |
| 2016/0206502 A1* | 7/2016 | Koltzow ............. A61H 1/008 |
| 2016/0310353 A1 | 10/2016 | Barasch |
| 2017/0312161 A1* | 11/2017 | Johnson ............. A61H 1/006 |
| 2020/0009010 A1* | 1/2020 | Park .................. A61H 23/006 |
| 2020/0179215 A1* | 6/2020 | Lerner .............. A61H 1/0266 |
| 2020/0230012 A1* | 7/2020 | Fuhr .................. A61H 23/00 |

FOREIGN PATENT DOCUMENTS

| | | |
|---|---|---|
| JP | 003077837 | 6/2001 |
| JP | 2005204777 | 4/2005 |
| JP | 2010534110 | 11/2010 |
| KR | 101123926 | 4/2012 |
| WO | 0119316 A1 | 3/2001 |
| WO | 2009014727 | 1/2009 |
| WO | 2014118596 | 8/2014 |
| WO | 2015038005 | 3/2015 |
| WO | 2018012105 A1 | 1/2018 |

OTHER PUBLICATIONS

PCT/US2018/022426 International Search Report & Written Opinion dated May 31, 2018.
AU 2016284030 Examination Report dated May 7, 2018.
JP2018-517683 Office Action.
CA 2990178 Office Action.
WORX Trans4mer "Safety and Operating Manual Original Instructions" for 12V Li-Ion Multi-purpose saw, WX540, WX540.3, VVX540.9, 2013.
Rachel [no family name indicated], "Jigsaw Massager", Apr. 18, 2010 (https://web.archive.org/web/20100418041422/ http://www.instructables.com/id/Jigsaw-Massager/).
Rockwell Trans4mer Operating Manual for Multi-purpose saw, Model RK2516/RK2516K, 2011.
International Search Report and Written Opinion issued in PCT/US20/31347.

* cited by examiner

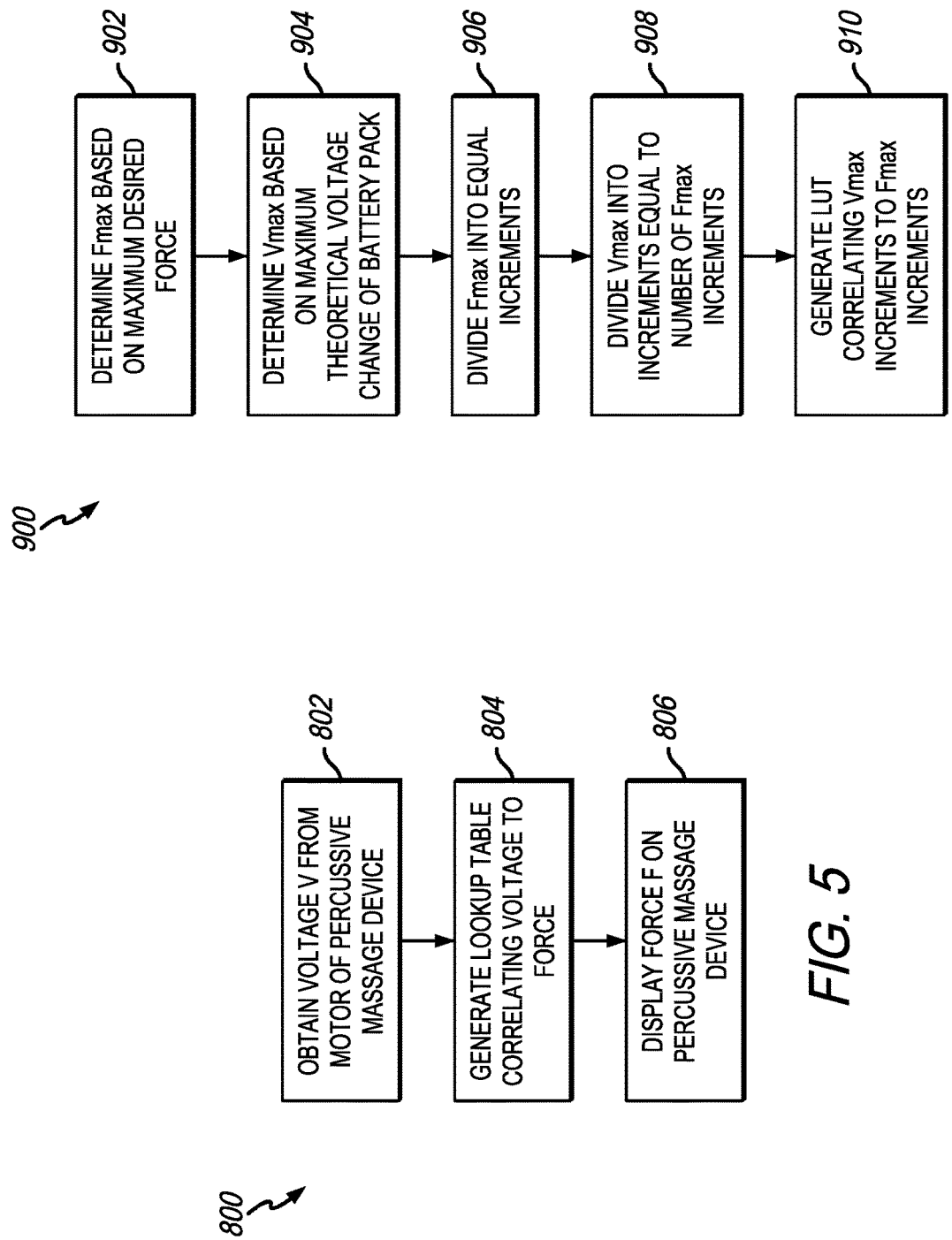

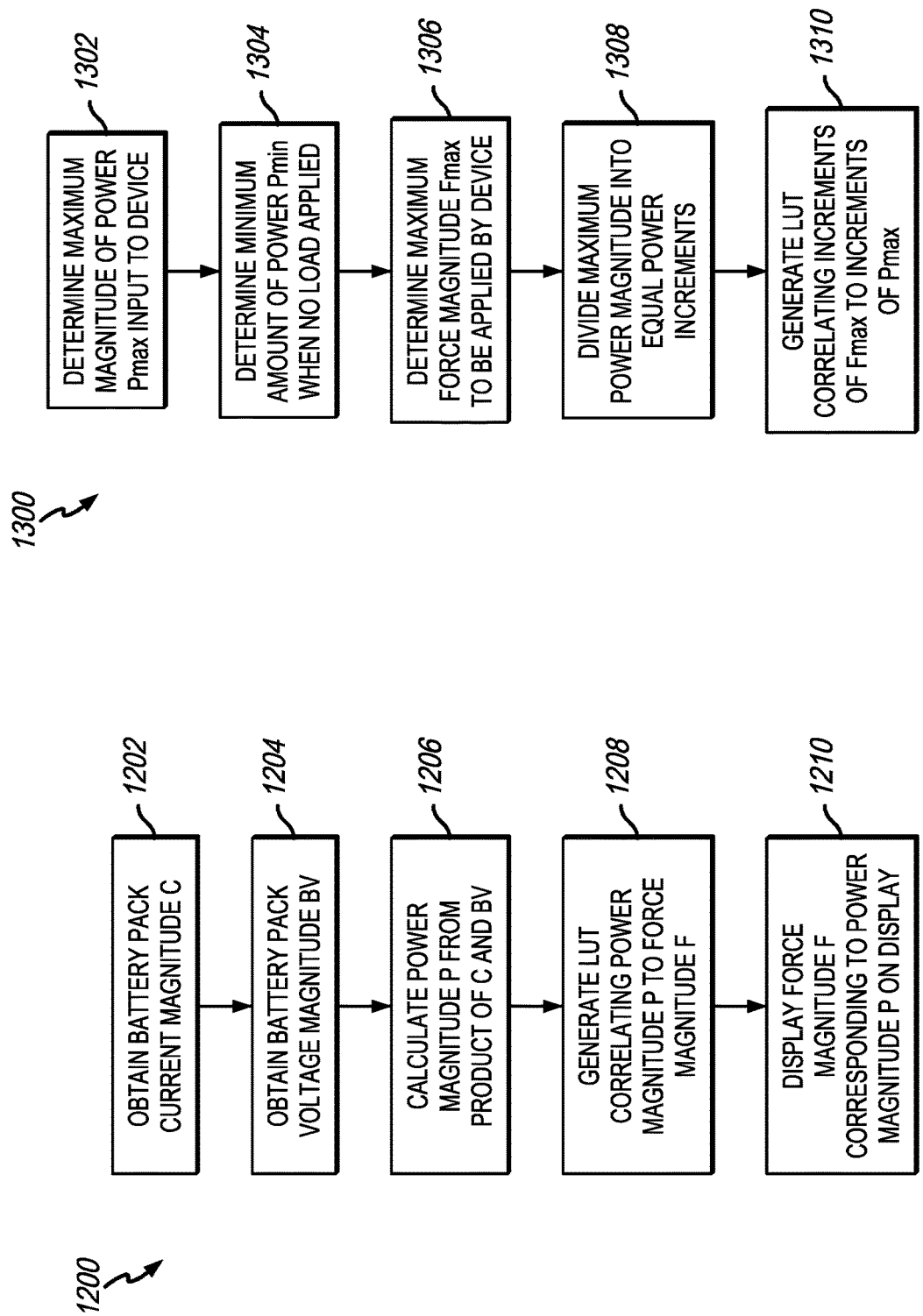

PERCUSSIVE MASSAGE DEVICE WITH FORCE METER

CROSS REFERENCE TO RELATED APPLICATIONS

This application claims the benefit of U.S. Provisional Application No. 62/844,424, filed May 7, 2019, U.S. Provisional Application No. 62/899,098, filed Sep. 11, 2019 and U.S. Provisional Application No. 62/912,392, filed Oct. 8, 2019, the entireties of which are incorporated herein by reference.

FIELD OF THE INVENTION

The present invention relates generally to a percussive massage device with a force meter.

BACKGROUND OF THE INVENTION

Percussive massage devices have become increasingly popular in recent years. However, when using the device, it is often difficult for users to know if they are applying the proper amount of pressure or force. The present invention addresses this issue.

SUMMARY OF THE PREFERRED EMBODIMENTS

In accordance with a first aspect of the present invention there is provided a percussive massage device with a force meter that includes a housing, an electrical source, a motor positioned in the housing, a switch for activating the motor, and a controller configured to obtain a voltage of the motor, generate a lookup table correlating voltage to force applied by the percussive massage device, and display a force magnitude corresponding to the obtained voltage using the lookup table. In a preferred embodiment, the lookup table is generated by determining a maximum magnitude of force configured to be applied by the percussive massage device, determining a maximum magnitude of voltage configured to be applied to the percussive massage device from a power source, dividing the maximum magnitude of force into equal force increments, and dividing the maximum magnitude of voltage into equal voltage increments. The number of equal force increments and the number of equal voltage increments is the same. Preferably, the percussive massage device includes a battery pack and a display configured to depict an amount of force applied by the percussive massage device. In a preferred embodiment, the display includes a series of LEDs. In a preferred embodiment, the percussive massage device includes an organic light-emitting diode screen.

In a preferred embodiment, the motor is a brushless direct-current (BLDC) motor. Preferably, the percussive massage device includes a voltage-sensing resistor electrically coupled to the BLDC motor and the controller.

In accordance with another aspect of the present invention there is provided a method of displaying force of a percussive massage device that includes obtaining a voltage of a motor of the percussive massage device, generating a lookup table correlating voltage to force applied by the percussive massage device, and displaying a force magnitude corresponding to the obtained voltage using the lookup table. In a preferred embodiment, the lookup table correlating voltage to force is linear. Preferably, the lookup table is generated by determining a maximum magnitude of force configured to be applied by the percussive massage device, determining a maximum magnitude of voltage configured to be applied to the percussive massage device from a power source, dividing the maximum magnitude of force into equal force increments, and dividing the maximum magnitude of voltage into equal voltage increments, wherein the number of equal force increments and the number of equal voltage increments is the same.

In a preferred embodiment, the method includes obtaining a maximum power source voltage of the percussive massage device, setting the maximum power source voltage to be the maximum magnitude of voltage, dividing the maximum magnitude of voltage into equal voltage increments, wherein the number of equal force increments and the number of equal voltage increments is the same, generating an updated lookup table correlating voltage to force applied by the percussive massage device corresponding to the range of voltages determined by the maximum power source voltage, and displaying a calibrated force magnitude corresponding to the power source voltage using the updated lookup table.

In a preferred embodiment, the method includes obtaining at least two power source voltages each corresponding to a magnitude of force, wherein the magnitude of force is determined from the displayed force magnitude, measuring a magnitude of force exerted by the percussive massage device using an external force meter for each of the at least two power source voltages, and generating an updated lookup table correlating voltage to force applied by the percussive massage device corresponding to the measured magnitudes of force.

In a preferred embodiment, the method includes displaying a calibrated force magnitude corresponding to the measured magnitudes of force using the updated lookup table. Preferably, the lookup table is updated for each magnitude of force capable of being displayed on the percussive massage device.

In accordance with another aspect of the present invention there is provided a method of displaying force of a percussive massage device that includes obtaining a current magnitude of a battery pack of the percussive massage device, obtaining a voltage magnitude of the battery pack, determining a power magnitude using the current magnitude and voltage magnitude of the battery pack, generating a lookup table correlating power magnitude to force magnitude applied by the percussive massage device, and displaying a force magnitude corresponding to the obtained power magnitude using the lookup table. In a preferred embodiment, the force magnitude is displayed utilizing a series of LEDs which are activated corresponding with the force magnitude. Preferably, the lookup table is generated by determining a maximum power magnitude to be input into the percussive massage device, determining a minimum power magnitude of the percussive massage device when no load is applied to the percussive massage device, determining a maximum force magnitude configured to be applied to the percussive massage device from a power source, dividing the maximum power magnitude into equal power increments, and dividing the maximum force magnitude into equal force increments. The number of equal power increments and the number of equal force increments is the same. Preferably, the maximum power magnitude is a maximum effective power magnitude derived from a total effective power.

In a preferred embodiment, the method includes determining at least two power magnitudes using current and voltage measurements of the battery pack, each corresponding to a magnitude of force. The magnitude of force is determined from the displayed force magnitude. Measuring a magnitude of force exerted by the percussive massage device using an external force meter for each of the at least two power magnitudes, and generating an updated lookup table correlating power to force applied by the percussive massage device corresponding to the measured magnitudes of force. In a preferred embodiment, the method includes displaying a calibrated force magnitude corresponding to the measured magnitudes of force using the updated lookup table. Preferably, the lookup table is updated for each magnitude of force capable of being displayed on the percussive massage device.

It will be appreciated that the inventive features discussed herein can be used with any type of percussive massage device. For example, the force meter and other features taught herein can be used with the percussive massage devices disclosed in U.S. Pat. No. 10,357,425 and U.S. patent application Ser. No. 16/675,772, filed Nov. 6, 2019, the entireties of which are incorporated herein by reference.

In an embodiment, a non-transitory computer-readable medium has stored thereon software instructions that, when executed by a processor, cause the processor to obtain a voltage of a motor of the percussive massage device, generate a lookup table correlating voltage to force applied by the percussive massage device, and display a force magnitude corresponding to the obtained voltage using the lookup table.

In an embodiment, the lookup table is generated by determining a maximum magnitude of force configured to be applied by the percussive massage device, determining a maximum magnitude of voltage configured to be applied to the percussive massage device from a power source, dividing the maximum magnitude of force into equal force increments, and dividing the maximum magnitude of voltage into equal voltage increments. In an embodiment, the number of equal force increments and the number of equal voltage increments is the same.

In another embodiment, a non-transitory computer-readable medium has stored thereon software instructions that, when executed by a processor, cause the processor to obtain a maximum power source voltage of the percussive massage device, set the maximum power source voltage to be the maximum magnitude of voltage, and divide the maximum magnitude of voltage into equal voltage increments, generate an updated lookup table correlating voltage to force applied by the percussive massage device corresponding to the range of voltages determined by the maximum power source voltage, and display a calibrated force magnitude corresponding to the power source voltage using the updated lookup table.

In another embodiment, a non-transitory computer-readable medium has stored thereon software instructions that, when executed by a processor, cause the processor to obtain at least two power source voltages each corresponding to a magnitude of force, wherein the magnitude of force is determined from the displayed force magnitude, measure a magnitude of force exerted by the percussive massage device using an external force meter for each of the at least two power source voltages; and generate an updated lookup table correlating voltage to force applied by the percussive massage device corresponding to the measured magnitudes of force.

In an embodiment, a non-transitory computer-readable medium has stored thereon software instructions that, when executed by a processor, cause the processor to obtain a current magnitude of a battery pack of the percussive massage device, obtain a voltage magnitude of the battery pack, determine a power magnitude using the current magnitude and voltage magnitude of the battery pack, generate a lookup table correlating power magnitude to force magnitude applied by the percussive massage device, and display a force magnitude corresponding to the obtained power magnitude using the lookup table.

In an embodiment, a non-transitory computer-readable medium has stored thereon software instructions that, when executed by a processor, cause the processor to determine at least two power magnitudes using current and voltage measurements of the battery pack, each corresponding to a magnitude of force, wherein the magnitude of force is determined from the displayed force magnitude, measure a magnitude of force exerted by the percussive massage device using an external force meter for each of the at least two power magnitudes, and generate an updated lookup table correlating power to force applied by the percussive massage device corresponding to the measured magnitudes of force.

In a preferred embodiment, the motor, in one embodiment, converts power from the power source into motion. In some embodiments, the motor is an electric motor. The electric motor may be any type of electric motor known in the art, including, but not limited to, a brushed motor, a brushless motor, a direct current (DC) motor, an alternating current (AC) motor, a mechanical-commutator motor, an electronic commutator motor, or an externally commutated motor.

In some embodiments, the actuated output or output shaft reciprocates at a rate of approximately 65 Hz. The actuated output, in some embodiments, reciprocates at a rate over 50 Hz. The reciprocating treatment device, in some embodiments, provides reciprocation at a rate ranging between 50 Hz and 80 Hz. In some embodiments, the actuated output has a maximum articulation rate of between 50 Hz and 80 Hz. In another embodiment, the actuated output has an articulation rate of between 30 Hz and 80 Hz. In certain embodiments, the actuated output has an articulation rate of approximately 37 Hz. In one embodiment, the actuated output has an articulation rate of approximately 60 Hz. In a preferred embodiment, the actuated output articulates or reciprocates at a frequency of between about 15 Hz and about 100 Hz. In a more preferred embodiment, the actuated output articulates or reciprocates at a frequency of between about 25 Hz and about 48 Hz. In the most preferred embodiment, the actuated output articulates or reciprocates at a frequency of between about 33 Hz and about 42 Hz. Any chosen range within the specified ranges is within the scope of the present invention.

The actuated output may move through a predetermined range of reciprocation. For example, the actuated output may be configured to have an amplitude of one half inch. In another embodiment, the actuated output may be configured to have an amplitude of one quarter inch. As will be appreciated by one skilled in the art, the actuated output may be configured to have any amplitude deemed therapeutically beneficial.

In some embodiments, the actuated output may be adjustable through a variable range of reciprocation. For example, the reciprocating treatment device may include an input to adjust the reciprocation amplitude from one quarter of an inch through a range of up to one inch. In a preferred embodiment, the actuated output moves through an amplitude of between about 0.15 inches and about 1.0 inches. In a more preferred embodiment, the actuated output articulates or reciprocates at a frequency of between about 0.23 inches and about 0.70 inches. In the most preferred embodiment, the actuated output articulates or reciprocates at a frequency of between about 0.35 inches and about 0.65 inches. Any chosen range within the specified ranges is within the scope of the present invention.

It will be appreciated that the device operates most effectively within the combined frequency and amplitude ranges. When developing the invention, the inventor determined that if the frequency and amplitude are above the ranges set forth above the device can cause pain and below the ranges the device is ineffective and does not provide effective therapeutic relief or massage. Only when the device operates within the disclosed combination of frequency and amplitude ranges does it provide efficient and therapeutically beneficial treatment to the muscles targeted by the device.

In certain embodiments, the reciprocating treatment device includes one or more components to regulate the articulation rate of the actuated output in response to varying levels of power provided at the power input. For example, the reciprocating treatment device may include a voltage regulator (not shown) to provide a substantially constant voltage to the motor over a range of input voltages. In another embodiment, the current provided to the motor may be regulated. In some embodiments, operation of the reciprocating treatment device may be restricted in response to an input voltage being below a preset value.

In a preferred embodiment, the percussive massage device includes a brushless motor. It will be appreciated that the brushless motor does not include any gears and is quieter than geared motors.

The device includes a push rod or shaft that is connected directly to the motor by a pin. In a preferred embodiment, the push rod is L-shaped or includes an arc shape. Preferably, the point where the push rod is connected to the pin is offset from reciprocating path that the distal end 40 of the push rod (and the massage attachment) travel. This capability is provided by the arc or L-shape. It should be appreciated that the push rod is designed such that it can transmit the force diagonally instead of vertically so the motor can be located at or near the middle of the device, otherwise a protrusion would be necessary to keep the shaft in the center with the motor offset therefrom (and positioned in the protrusion). The arc also allows the push rod to have a close clearance with the motor and allows the outer housing to be smaller than similar prior art devices, therefore making the device lower profile. Preferably two bearings are included at the proximal end of the push rod where it connects to the motor to counteract the diagonal forces and preventing the push rod for moving and touching the motor.

In a preferred embodiment, the device includes a touch screen for stopping, starting, activating, etc. The touch screen can also include other functions. Preferably, the device includes a thumbwheel or rolling button positioned near the touch screen/on off button to allow the user to scroll or navigate through the different functions. Preferably, the device also includes variable amplitude or stroke. For example, the stroke can change or be changed between about 8-16 mm.

In a preferred embodiment, the device is associated with and can be operated by an app or software that runs on a mobile device such as a phone, watch or tablet (or any computer). The app can connect to the device via bluetooth or other connection protocol. The app can have any or all of the following functions. Furthermore, any of the functions discussed herein can be added to the touch screen/scroll wheel or button(s) capability directly on the device. If the user walks or is located too far away from the device, the device will not work or activate. The device can be turned on an off using the app as well as the touch screen or button on the device. The app can control the variable speeds (e.g., anywhere between 1750-3000 RPM). A timer so the device stops after a predetermined period of time. The app can also include different treatment protocols associated therewith. This will allow the user to choose a protocol or area of the body they want to work on. When the start of the protocol is selected, the device will run through a routine. For example, the device may run at a first RPM for a first period of time and then run at a second RPM for a second period of time and/or at a first amplitude for a first period of time and then run at a second amplitude for a second period of time. The routines can also include prompts (e.g., haptic feedback) for letting the user to know to move to a new body part. These routines or treatments can be related to recovery, blood flow increase, performance, etc. and can each include a preprogrammed routine. The routines can also prompt or instruct the user to switch treatment structures (AmpBITS) or positions of the arm or rotation head. The prompts can include sounds, haptic feedback (e.g., vibration of the device or mobile device), textual instructions on the app or touch screen, etc. For example, the app may instruct the user to start with the ball treatment structure with the arm in position two. Then the user hits start and the device runs at a first frequency for a predetermined amount of time. The app or device then prompts the user to begin the next step in the routine and instructs the user to change to the cone treatment structure and to place the arm in position 1. The user hits start again and the device runs at a second frequency for a predetermined amount of time.

In a preferred embodiment, the app includes near field communication ("NFC") capability or other capability that allows the user's mobile device with the app thereon to scan an identifier, such as a barcode or a QR code that prompts the app to display certain information, such as the routines discussed above. In use, a user will be able to tap or place their mobile device near an NFC tag (or scan a QR code) on a piece of gym equipment and the app will show instructions, content or a lesson that is customized for using the device with that piece of equipment. For example, on a treadmill, the user scans the QR code or NFC tag and the app recognizes that the user is about to use the treadmill. The app can then provide instructions for how to use the device in conjunction with the treadmill and can initiate a preprogrammed routine for using the treadmill. For example, the user can be instructed to start with the left quad. Then, after a predetermined period of time (e.g., 15 seconds), the device vibrates or provides other haptic feedback. The user then switches to their left quad and after a predetermined period of time the device again vibrates. The user can then begin using the treadmill. Any routine is within the scope of the present invention. In an embodiment, the device and/or app (i.e., the mobile device containing the app) can also communicate (via bluetooth or the like) with the gym equipment (e.g., treadmill).

The device can also include a torque or force meter to let the user know how much force they are applying. The display associated with the force meter shows how much force is being applied on the muscle. The force meter allows for a more precise and effective treatment. The device includes a torque measuring sensor and display. Depending on the muscle the device is being used on and the benefit the user is looking to get (prepare, perform, recover) the force that should be applied varies. By having a torque sensor, the user is able to get a more precise and personalized treatment. The app and the touchscreen can provide the force information to the user. The force meter can be integrated with the routines and the user can be provided feedback with whether they are applying too much or too little pressure. The device can also include a thermal sensor or thermometer that can determine the temperature of the user's muscle and to provide feedback to the device and/or app. The haptic feedback can also provide feedback for too much pressure or force.

In a preferred embodiment, the percussive massage device includes a motor mount for mounting the brushless motor within the housing and for distributing forces from the motor as it operates to the housing. The motor is secured to a first side of the motor mount and the second or opposing side of the motor mount is secured to the housing. The motor mount includes a plurality of arms that space the motor from the housing and define a reciprocation space in which the push rod and associated components (counterweight, etc.) reciprocate. Threaded fasteners connect the motor mount to the housing. In a preferred embodiment, dampening members or feet are received on the shaft of the threaded fastener. The dampening members each include an annular slot defined therein. The annular slots receive housing. This prevents direct contact of the threaded fasteners with the housing and reduces sound from vibrations. The threaded fasteners are received in openings in tabs at the end of the arms.

In a preferred embodiment, the motor is housed in a motor housing that is rotatable within the main housing. The motor housing is basically the equivalent of the gear box housing in related embodiments. In a preferred embodiment, there are opposite openings in the outside of the motor housing that expose the motor on one side and the motor mount on the other. The openings provide ventilation for the motor and allow the motor mount to connect directly to the main housing.

In a preferred embodiment, the device includes a touch screen as well as button(s) for operating the device. For example, the device can include a touch screen, a center button for turning the device on and off and a ring/rocker button that provides the ability to scroll left and right (e.g., to the preset treatments discussed herein) and up and down (e.g., to control the speed or frequency). The screen can also be a non-touch screen.

In another preferred embodiment, any of the devices taught herein can include the ability to vary the amplitude, thus providing a longer or shorter stroke depending on the application or needs of the user. The amplitude variability can also be part of the routines or presets discussed herein. For example, the device can include a mechanical switch that allows the eccentricity of the connector to be modified (e.g., between 4 mm and 8 mm). The mechanism can include a push button and a slider. The pin structure has a spring that lets it fall back into the locked position.

BRIEF DESCRIPTION OF THE DRAWINGS

The invention may be more readily understood by referring to the accompanying drawings in which:

FIG. 5 is a flow diagram showing a method of detecting force applied by the percussive massage device in accordance with a preferred embodiment;

FIG. 6 is a flow diagram showing a method of generating a lookup table correlating voltage to force in accordance with a preferred embodiment;

FIG. 12 is a flow diagram showing a method of detecting force applied by a percussive massage device in accordance with a preferred embodiment;

FIG. 13 is a flow diagram showing a method of generating a lookup table correlating power to force in accordance with a preferred embodiment;

Like numerals refer to like parts throughout the several views of the drawings.

DETAILED DESCRIPTION OF THE PREFERRED EMBODIMENTS

Figure 1:
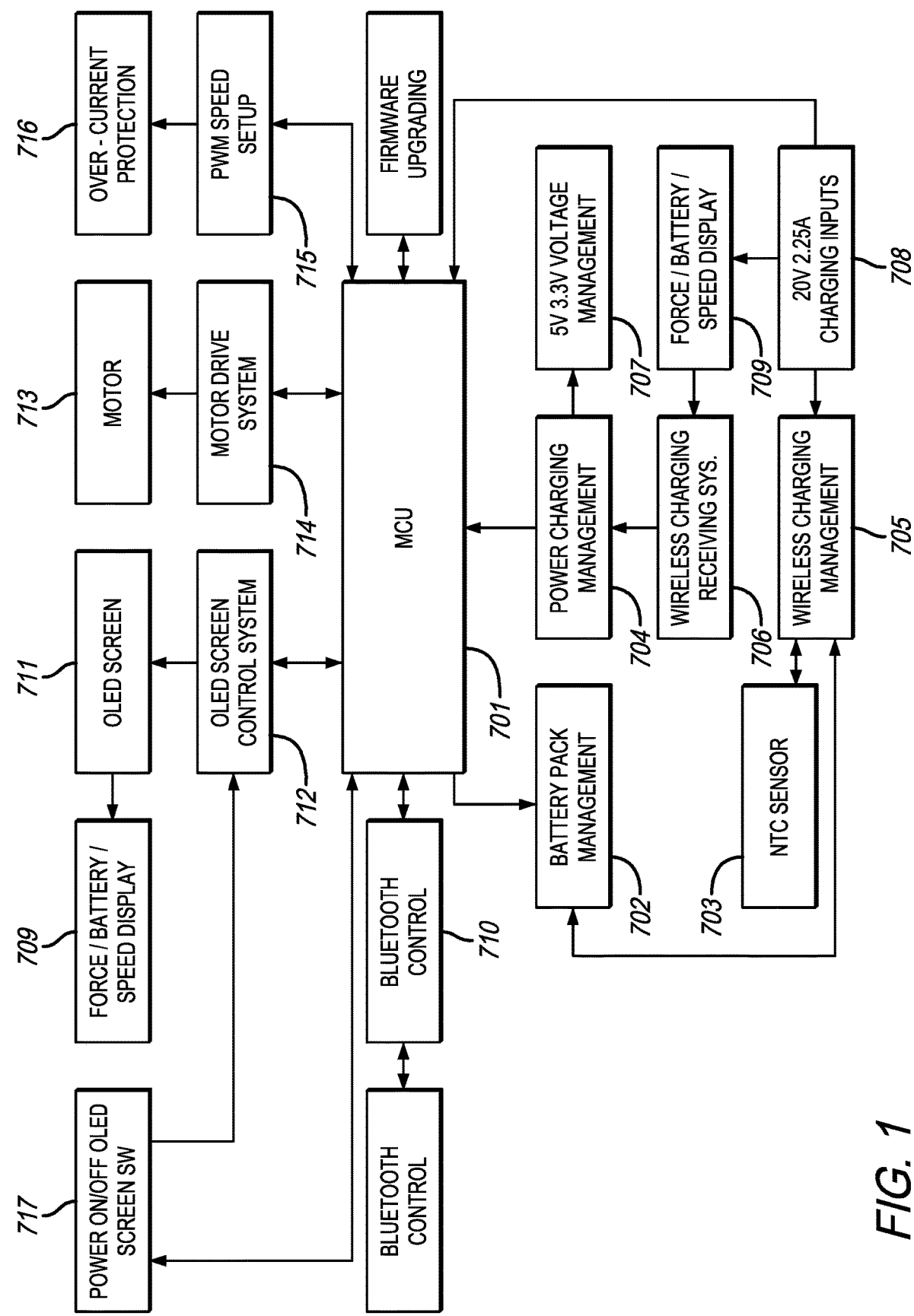
FIG. 1 is a block diagram showing interconnected components of a percussive massage device with a force meter.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

FIGS. 1-19 show embodiments in accordance with a percussion massage device with a force meter. FIG. 1 is a block diagram showing interconnected components of a percussive massage device with a force meter 700. In an embodiment, the percussive massage device with force meter 700 includes a microcontroller unit 701, a battery pack management unit 702, an NTC sensor 703, a power charging management unit 704, a wireless charging management unit 705, a wireless charging receiving system 706, a voltage management unit 707 (5V 3.3V Voltage Management in drawings), battery charging inputs 708 (20V 2.25 A Charging Inputs in drawings), a display 709 (Force/Battery/Speed Display in drawings), a wireless control unit 710 (Bluetooth Control in drawings), an OLED screen 711, an OLED screen control system 712, a motor 713, a motor drive system 714, a PWM speed setup unit 715, an over-current protection unit 716, and a power switch unit 717 (Power On/Off OLED Screen SW in drawings). In the embodiment shown in accordance with FIG. 1, each block in the diagram is shown as a separate component. In alternative embodiments, however, certain components may be combined without departing from the scope of the present disclosure.

The microcontroller unit 701, in an embodiment, is a microcontroller unit including a processor, a memory, and input/output peripherals. In other embodiments, however the microcontroller unit 701 is an ST Microelectronics STM32F030K6 series of microcontroller units, STM32F030C8T6 series of microcontrollers, STM32F030CCT6 series of microcontrollers, or an equivalent microcontroller.

One of ordinary skill would understand that the memory of the microcontroller unit 701 is configured to store machine-readable code for processing by the processor of the microcontroller unit 701. Various other configurations may exist depending on whether the designer of the percussive massage device with force meter 700 desires to implement the machine-readable code in software, firmware, or both. In an embodiment, the machine-readable code is stored on the memory and configured to be executed by a processor of the microcontroller 701. In an embodiment, the machine-readable code is stored on computer-readable media.

The battery pack management unit 702, in an embodiment, is implemented in firmware or software and configured to be used in connection with the microcontroller unit 701. In this embodiment, the firmware or software is stored in memory (not shown) and configured to be obtainable by the microcontroller unit 701. The battery pack management unit 702 may also be a combination of firmware, software, and hardware, in another embodiment. The battery pack management unit 702 is coupled with the NTC sensor 703. The NTC sensor 703 is a negative temperature coefficient thermistor used by the battery pack management unit 702 to sense temperature of the battery pack. For example, the NTC sensor 703 is a thermistor with B value of 3950+/−1%, and a resistance of 10 kΩ. In another example, the thermistor has a resistance of 100 kΩ. One of ordinary skill in the art would recognize that a thermistor is a resistor whose resistance is dependent upon temperature. In other embodiments, however, the NTC sensor 703 may be another type of temperature sensing device or component used in connection with the battery pack management unit 702.

The power charging management unit 704, in an embodiment, is implemented in firmware or software and configured to be used in connection with the microcontroller unit 701. Similarly to the battery pack management unit 702, the power charging management unit 704 firmware or software is stored in memory (not shown) and configured to be obtainable by the microcontroller unit 701. The power charging management unit 704 may also be a combination of firmware, software, and hardware, in another embodiment. In various embodiments, the power charging management unit 704 is configured to charge a battery pack via a direct connection or through an external charger, such as when configured to be operable with rechargeable batteries.

The wireless charging management unit 705, in an embodiment, is coupled to the battery pack management unit 702 and the battery charging inputs 708. In other embodiments, the battery or battery pack is charged using other conventional methodologies, such as, for example, charging the battery or battery pack using a wire or cord coupled to the battery charging inputs 708.

The wireless charging receiving system 706, in an embodiment, is coupled to the power charging management unit 704 and the display 709. The wireless charging receiving system 706 includes one or more of firmware, software, and hardware. In an embodiment, the wireless charging receiving system 706 is configured to receive information pertaining to battery capacity, charging metrics, and other information pertaining to wireless charging, and to pass along the information to the power charging management unit 704. The wireless charging receiving system 706 preferably includes a wireless charging pad used to charge the percussive massage device with force meter 700. One of ordinary skill in the art would understand that a variety of wireless charging devices may be utilized to wirelessly charge the percussive massage device with force meter 700. As one example, the Qi wireless charging standard and related devices may be utilized to wirelessly charge the percussive massage device with force meter 700.

The voltage management unit 707, in an embodiment, is a DC voltage regulator that steps down 5 volt to 3.3 volt power for use by the microcontroller unit 701. The voltage management unit 707 may also perform additional functions for management of 3.3 volt power for use by the microcontroller unit 701. In an embodiment, the voltage management unit 707 is implemented using a series of electronic components such as, for example, implementing a resistive divider using electronic components. In another embodiment, the voltage management unit 707 is a stand-alone voltage regulator module and/or device designed to step down voltage from 5 volts to 3.3 volts. One of ordinary skill in the art would understand the various methodologies and devices available to step down 5 volts to 3.3 volts.

The battery charging inputs 708, in an embodiment, are interfaces by which a wire or cord may be inserted for charging the percussive massage device with force meter 700. For example, a standardized barrel connector is the battery charging inputs 708. In another example, the battery charging inputs 708 is a USB connector. Other more specialized charging methodologies may require a particular battery charging input not described above.

The display 709, in an embodiment, displays a series of LEDs depicting an amount of force applied by the percussive massage device with force meter 700. In an alternative embodiment, the display 709 displays a series of LEDs depicting the current battery or battery pack charge of the percussive massage device with force meter 700. In yet another embodiment, the display 709 displays a series of LEDs depicting the current speed of the percussive massage device with force meter 700. One of ordinary skill in the art would recognize that while LEDs have been specified in the above-referenced embodiments, other embodiments not using LEDs are within the scope of this disclosure, such as, for example, liquid crystal displays, OLEDs, CRT displays, or plasma displays. One of ordinary skill in the art would also understand that it may be advantageous in an embodiment utilizing a battery or battery pack to use low-power options to ensure battery power longevity. In an embodiment, the display 709 is a 128×64 pixel OLED display.

The wireless control unit 710 is a wireless connectivity device that may be implemented in a wireless microcontroller unit. In an embodiment, the wireless control unit 710 is a Bluetooth transceiver module configured to couple, via Bluetooth, to a remote device. In an embodiment, the Bluetooth module is a Bluetooth Low-Energy (BLE) module configured to be run in broadcast mode. The wireless control unit 710 is coupled to the microcontroller unit 701. In an embodiment, the remote device is a smartphone having an embedded Bluetooth module. In an alternative embodiment, the remote device is a personal computer having Bluetooth connectivity. In other embodiments, other wireless connectivity standards besides the Bluetooth wireless standard may be utilized. One of ordinary skill in the art would recognize that low-power wireless control modules may be advantageous when the percussive massage device with force meter 700 is utilizing a battery or battery pack.

The OLED screen 711 and the OLED screen control system 712, in an embodiment, are configured to display substantially the same information as the display 709 referenced above. The OLED screen 711 is coupled to the OLED screen control system 712. The OLED screen control system 712 is coupled to the microcontroller unit 701, the OLED screen 711, and the power switch unit 717. In an embodiment, the display 709 and the OLED screen 711 may be redundant and it may only be necessary to utilize one or the other.

The motor 713, in an embodiment, is a brushless direct current (BLDC) motor. The motor 713 and the motor drive system 714, in an embodiment, are configured to vary the speed (i.e., rotational motion) that may be converted to reciprocal motion. In other embodiments, the motor 713 is a brushed DC motor, a brushed AC motor, or a brushless AC motor. One of ordinary skill in the art would understand that choosing a brushless or brushed motor, or direct current or alternating current, may vary depending on the application and intended size, battery power, and use.

The PWM speed setup unit 715, in an embodiment, is used to control pulse width modulation utilized to drive the motor 713. The PWM speed setup unit 715 is coupled to the microcontroller unit 701 and the over-current protection unit 716. One of ordinary skill in the art would understand that pulse width modulation is one way to vary the average power applied to the motor 713, resulting in varying speed as desired. In alternative embodiments, one of ordinary skill in the art would understand that there are a variety of methods to vary the speed of a brushless DC motor. For example, voltage to the motor 713 may be controlled in other non-PWM methods.

The over-current protection unit 716, in an embodiment, may be a feature of an integrated system-in-package to prevent damage caused by high currents to the motor. In other embodiments, the over-current protection unit 716 is implemented using a series of electronic components configured to protect the motor from excessively high current.

The power switch unit 717, in an embodiment, is configured to turn on and turn off the percussive massage device with force meter 700. The power switch unit 717 is coupled to the OLED screen control system 712 and the microcontroller unit 701. In an embodiment, the power switch unit 717 is the switch 404.

Figure 2:
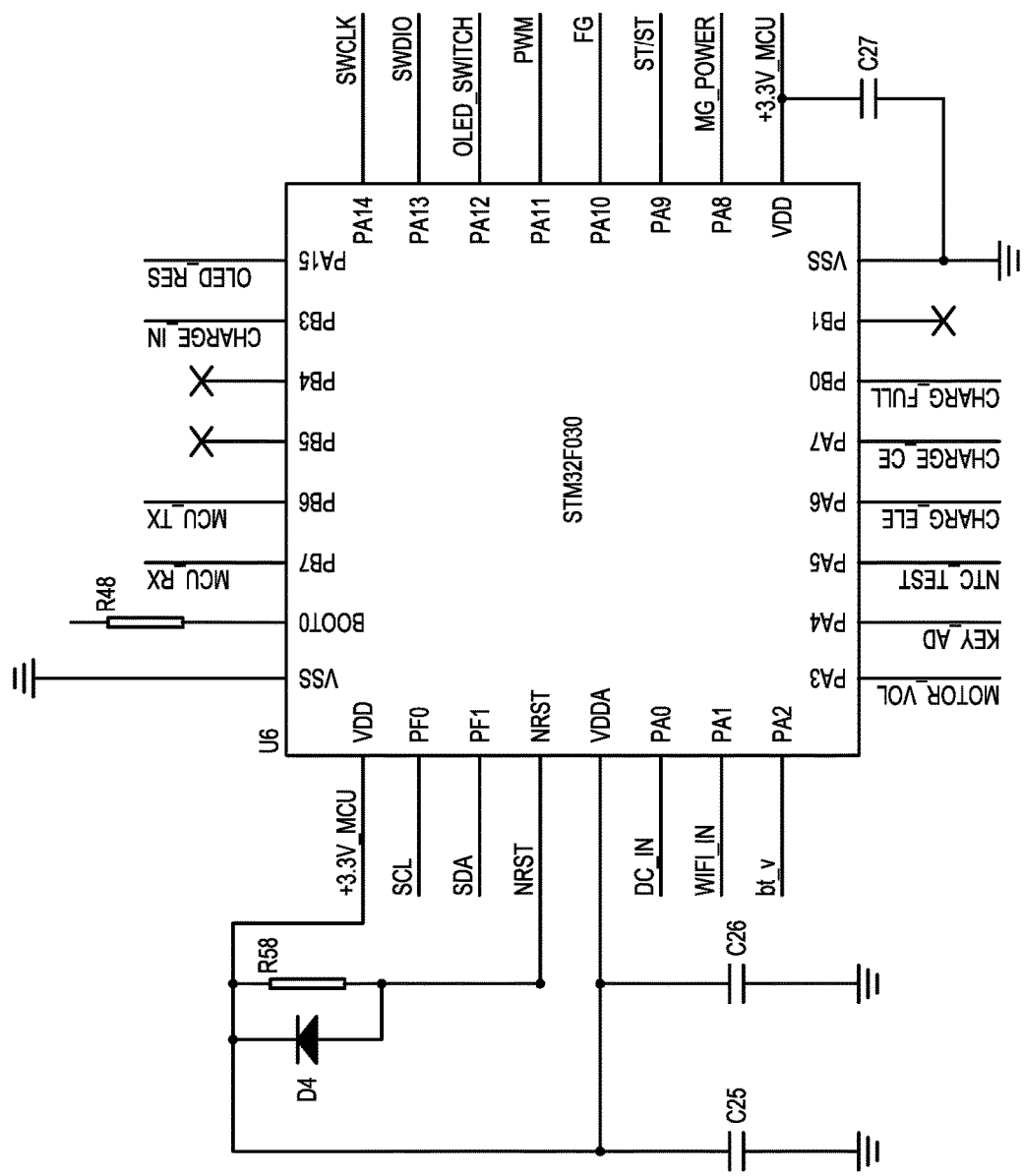
FIG. 2 is a circuit diagram of a microcontroller unit with pin outputs in accordance with one embodiment.

FIG. 2 shows a circuit diagram of the microcontroller unit 701 with pin outputs. In this embodiment, the STM32F030K6 series of microcontroller units is utilized. The circuit diagram depicts +3.3 volt power being provided to the VDD inputs of the microcontroller unit 701. Input PA3 is labeled "Motor_VOL", the voltage of the motor 713. Input PA2 is "bt_v", the battery or battery pack voltage. The microcontroller unit is configured to receive analog voltage on inputs PA2 and PA3 and to convert it to digital voltage using the microcontroller's analog-to-digital converter. In this embodiment, the analog-to-digital converter is a 12-bit ADC. One of ordinary skill in the art would understand that other microcontrollers may utilize voltage sensing and analog-to-digital converters to perform similar functions. In yet other embodiments, an analog-to-digital converter module separate from a microcontroller may be utilized.

Figure 3:
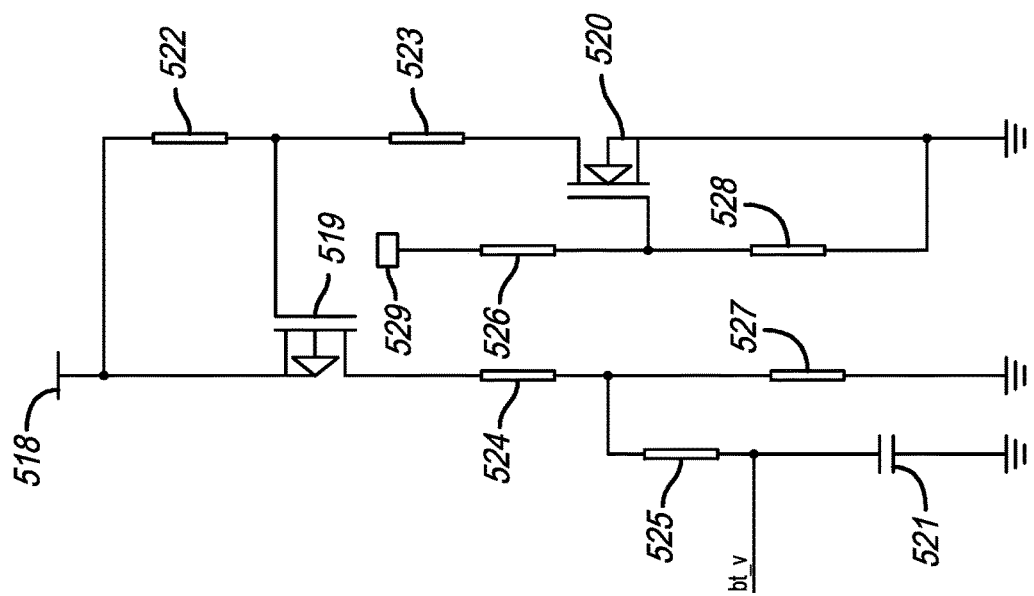
FIG. 3 is a circuit diagram used for battery voltage detection in accordance with one embodiment.

FIG. 3 shows a circuit diagram used for battery voltage detection. In this embodiment, +BT, the positive battery terminal 518, is coupled to a circuit consisting of a P-channel MOSFET 519, an N-Channel MOSFET 520, 0.1 µF capacitor 521, 100 kΩ resistors 522, 523, 68 kΩ resistor 524, 1 kΩ resistors 525, 526, and 10 kΩ resistors 527, 528. The circuit is configured to provide an input analog voltage of the battery or battery pack, or bt_v, to the microcontroller unit 701 of FIG. 2. In other embodiments, voltage of the battery or battery pack may be achieved using a voltage reader coupled to the terminals of the battery or battery pack.

Figure 4:
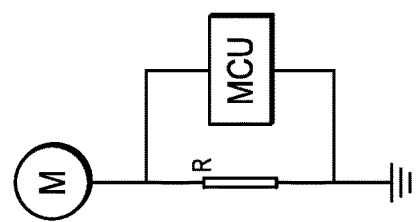
FIG. 4 is a circuit diagram for detection and measurement of voltage of the motor of the percussive massage device in accordance with one embodiment.

FIG. 4 shows a circuit diagram for detection and measurement of voltage of the motor 713 of the percussive massage device. In this embodiment, voltage sensing resistor 529 is coupled in parallel with the microcontroller unit 701, and coupled to the motor 713. In an embodiment, the voltage sensing resistor has a value of 0.0025Ω. The circuit depicted in FIG. 4 is configured to provide the Motor_VOL input into the microcontroller unit 701 of FIG. 2. In an embodiment, the input analog voltage is amplified. In another embodiment, the voltage of the motor 713 is measured or sensed using a separate series of electronic components or a standalone device and input into a microprocessor for use with the method of displaying a force on the percussive massage device.

FIG. 5 is a flow diagram showing a method 800 of detecting force applied by the percussive massage device in accordance with a preferred embodiment. At Step 802, a voltage magnitude V is obtained. In an embodiment, voltage magnitude V is an analog voltage obtained by using the circuit disclosed in FIG. 2. In that circuit, a block curve signal from the motor 713 (i.e., a Hall effect sensor) is simulated in the circuit as current using the resistor R, which is placed in parallel with the microcontroller unit 701. In other embodiments, voltage that corresponds to the current operating speed of the motor 713 may be generated in a variety of other ways. The voltage magnitude V may be input to a microcontroller unit 701 that converts analog voltage to digital voltage using an analog-to-digital converter, such as that implemented in the STM32F030K6 microcontroller unit. The STM32F030K6 microcontroller unit coverts analog voltage magnitude to a digital code corresponding to the 12-bit ADC (i.e., 0 to 4096). The digital code represents a voltage magnitude corresponding to the original voltage magnitude V obtained.

At Step 804, a lookup table is generated that correlates voltage V to force magnitude F. In an embodiment, the lookup table is generated using a method 900 of generating a lookup table correlating voltage to force. For example, the force magnitude F may be expressed in pounds of force. In an alternative embodiment, the force magnitude F may be expressed in Newtons of force.

At Step 806, the force magnitude F corresponding to voltage magnitude V is displayed on the percussive massage device with force meter 700. In an embodiment, a series of LED lights may be utilized to depict varying amounts of force as the force is being applied by the percussive massage device with force meter 700. Thus, as the amount of force magnitude F increases, more LEDs on the series of LED lights will be lit. Preferably, the series of LED lights consists of 12 LED lights.

FIG. 6 is a flow diagram showing a method 900 of generating a lookup table correlating voltage to force. At Step 902, a maximum magnitude of force, $F_{MAX}$, is determined. The magnitude of $F_{MAX}$ may be determined by assessing the maximum desired force to apply using the percussive massage device with force meter 700. As an example, $F_{MAX}$ is 60 pounds of force.

At Step 904, a maximum magnitude of voltage, $V_{MAX}$, is determined. The magnitude of $V_{MAX}$ may be determined by assessing the maximum theoretical voltage change possible by the percussive massage device with force meter 700. As an example, $V_{MAX}$ is 1.8 volts.

At Step 906, $F_{MAX}$ is divided into equal increments. Using the above example from Step 902, 60 pounds of force is divided into 60 one-pound increments.

At Step 908, $V_{MAX}$ is divided into the same amount of increments as determined in Step 906 above. Thus, using the above example from Step 904, 1.8 volts is divided into 60 0.3-volt increments.

Figure 7:
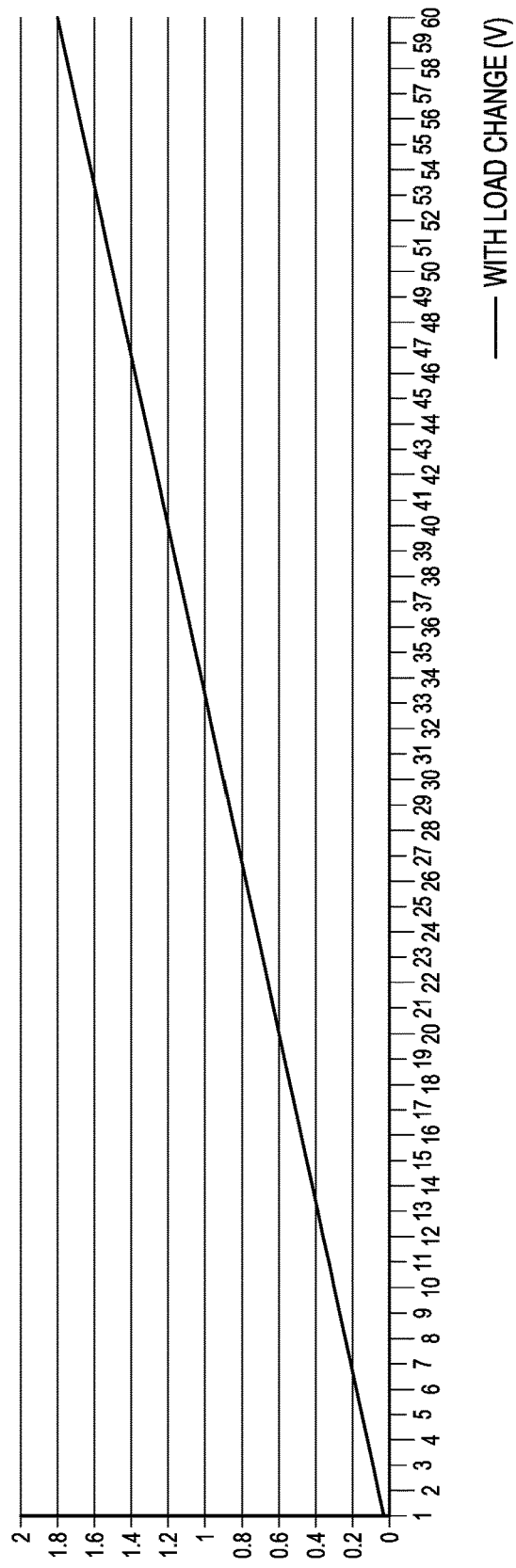
FIG. 7 is a graph plotting a lookup table for use by a method of detecting force applied by the percussive massage device that was generated by correlating voltage to force in accordance with a preferred embodiment.

At Step 910, a lookup table (LUT) is generated that correlates the increments of pounds of force with the increments of voltage. This necessarily creates a linear relationship between force and voltage. FIG. 7 is a graph plotting the LUT for use by the method of detecting force of FIG. 5 that was generated using the specific example identified in FIG. 6. The graph depicts calculated force that was calculated using the method 900.

A problem may arise in that the theoretical maximum voltage assumption at Step 904 in the method 900 is inaccurate. It may also be the case that as the percussive massage device with force meter 700 is used, the maximum available voltage degrades over time. In other words, the battery or battery pack voltage may decrease.

Figure 8:
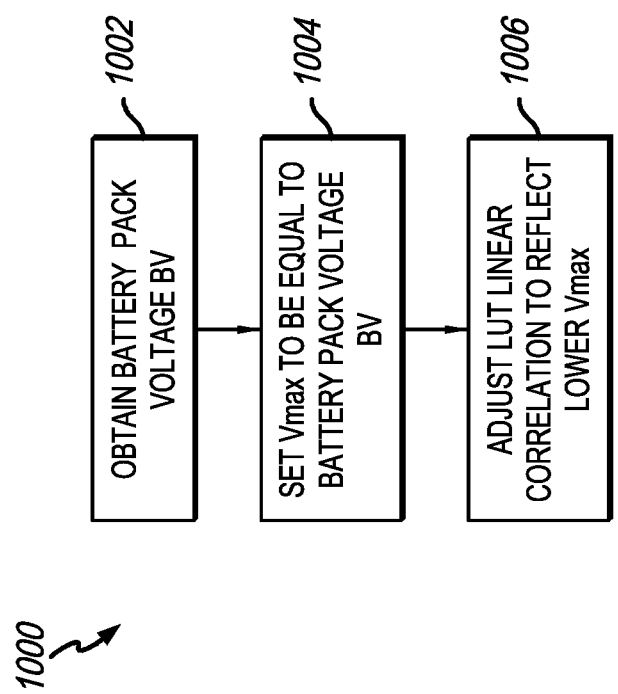
FIG. 8 is a flow diagram showing a method of calibrating a lookup table according to a preferred embodiment.

Accordingly, a method 1000 of calibrating the LUT generated by method 900 may be advantageous. FIG. 8 is a flow diagram showing a method 1000 of calibrating a LUT. At Step 1002, battery pack voltage BV is obtained. In an embodiment, battery pack voltage magnitude BV is an analog voltage obtained by using the circuit disclosed in FIG. 3. In that circuit, the battery pack voltage magnitude BV may be input to a microcontroller unit 701 that converts analog voltage to digital voltage using an analog-to-digital converter, such as that implemented in the STM32F030K6 microcontroller unit. The STM32F030K6 microcontroller unit coverts analog voltage magnitude to a digital code corresponding to the 12-bit ADC (i.e., 0 to 4096). The digital code represents a voltage magnitude corresponding to the original battery pack voltage magnitude BV obtained.

Figure 9:
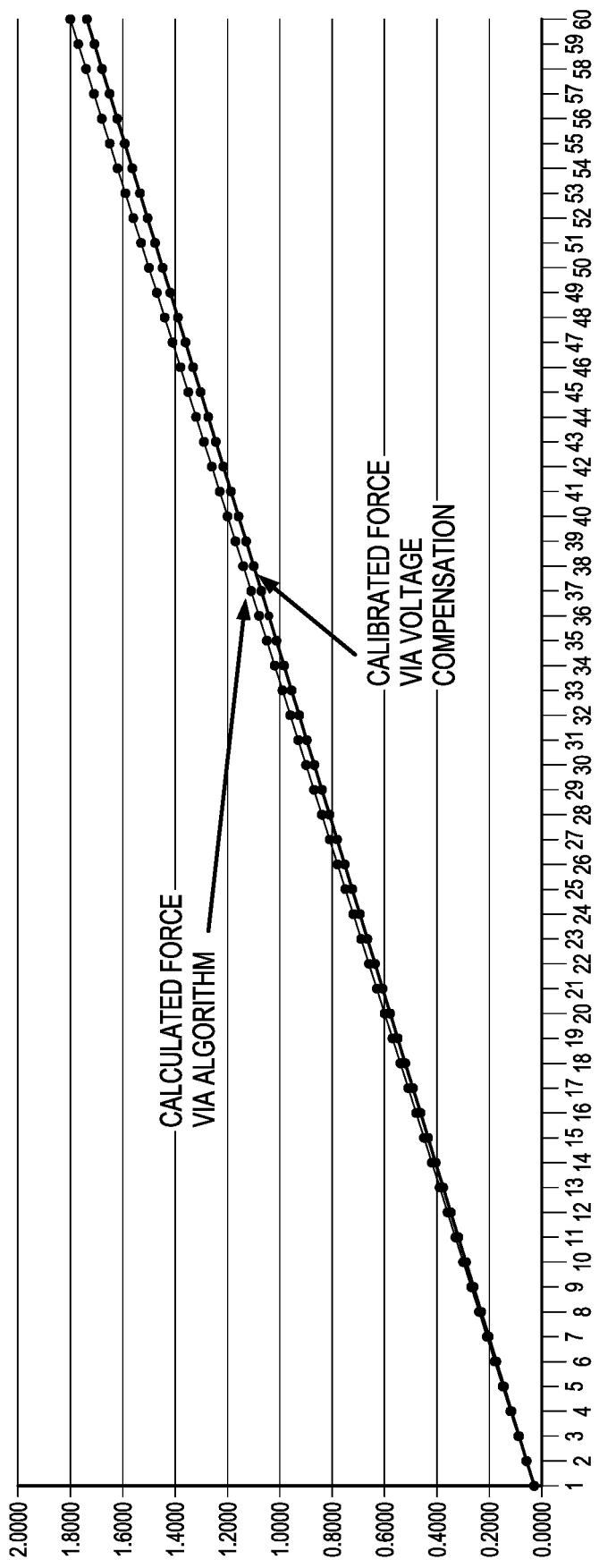
FIG. 9 is a graph plotting a lookup table generated by a method of detecting force applied by the percussive massage device against a lookup table calibrated by using a method of calibrating a lookup table according to a preferred embodiment.

At Step 1004, $V_{MAX}$ is set to the actual battery voltage magnitude BV output. As an example, may decrease from 1.8 volts to 1.74 volts, a 0.6 volt decrease. At Step 1006, the LUT linear correlation is adjusted to reflect the lower $V_{MAX}$. FIG. 9 is a graph plotting the LUT calculated by the method 900 against the LUT calibrated by using the method 1000. The LUT resulting from method 1000 depicts a calibrated force rather than a calculated force.

Figure 10:
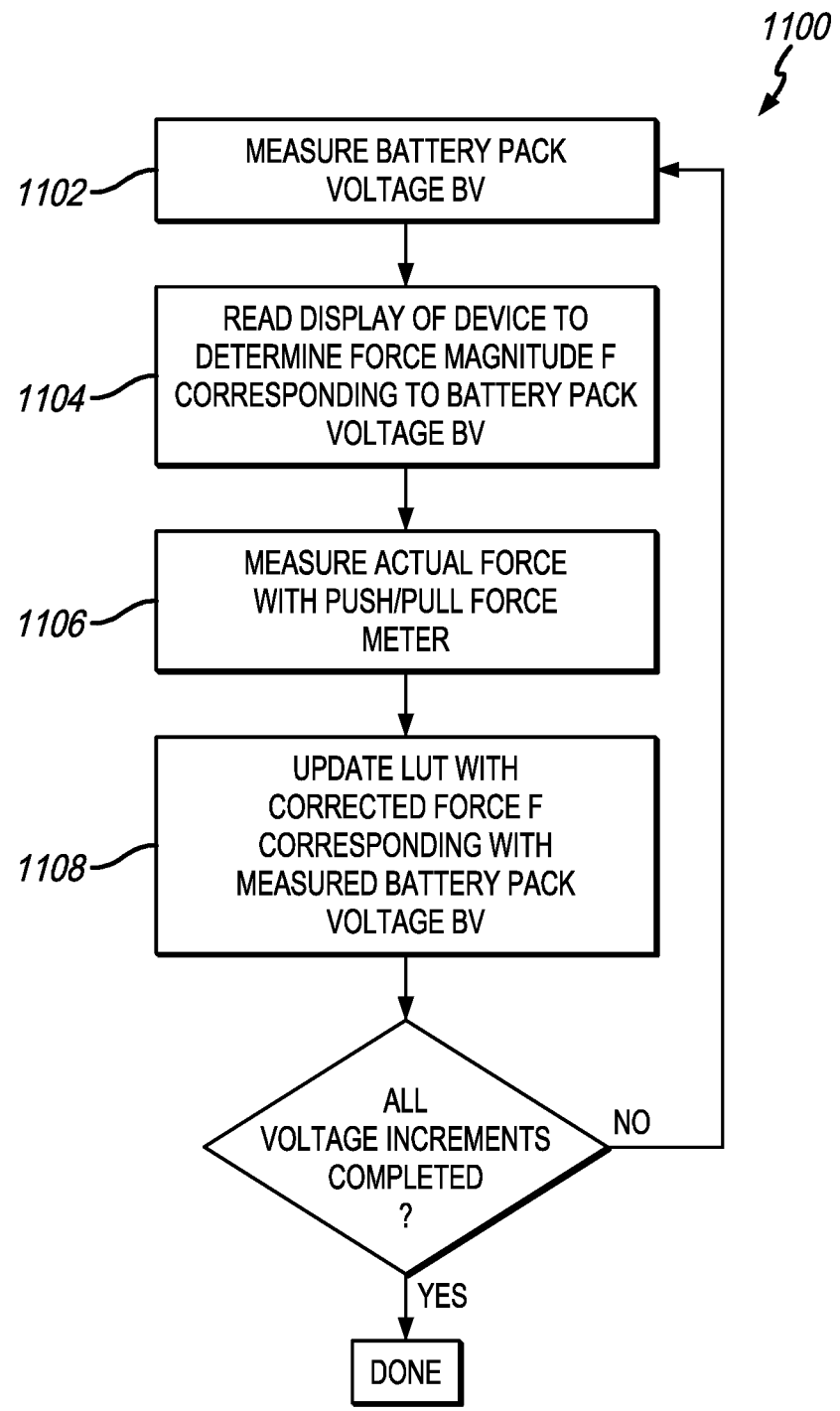
FIG. 10 is a flow diagram showing a method of calibrating a lookup table.

FIG. 10 is a flow diagram showing a method 1100 of calibrating a LUT. The method 1100 may be performed after the method 900, or entirely separately from the method 900. At Step 1102, battery pack voltage BV is measured. In an embodiment, the measurement is done without applying any force from the percussive massage device with force meter 700. In an embodiment, the battery pack voltage BV is measured using an external voltage meter. In another embodiment, the battery pack and/or microcontroller unit 701 have embedded solutions for directly measuring battery pack voltage BV.

At Step 1104, the display on the percussive massage device with force meter 700 that displays the force magnitude F is read to determine the force magnitude F corresponding to the measured battery pack voltage BV.

Figure 11:
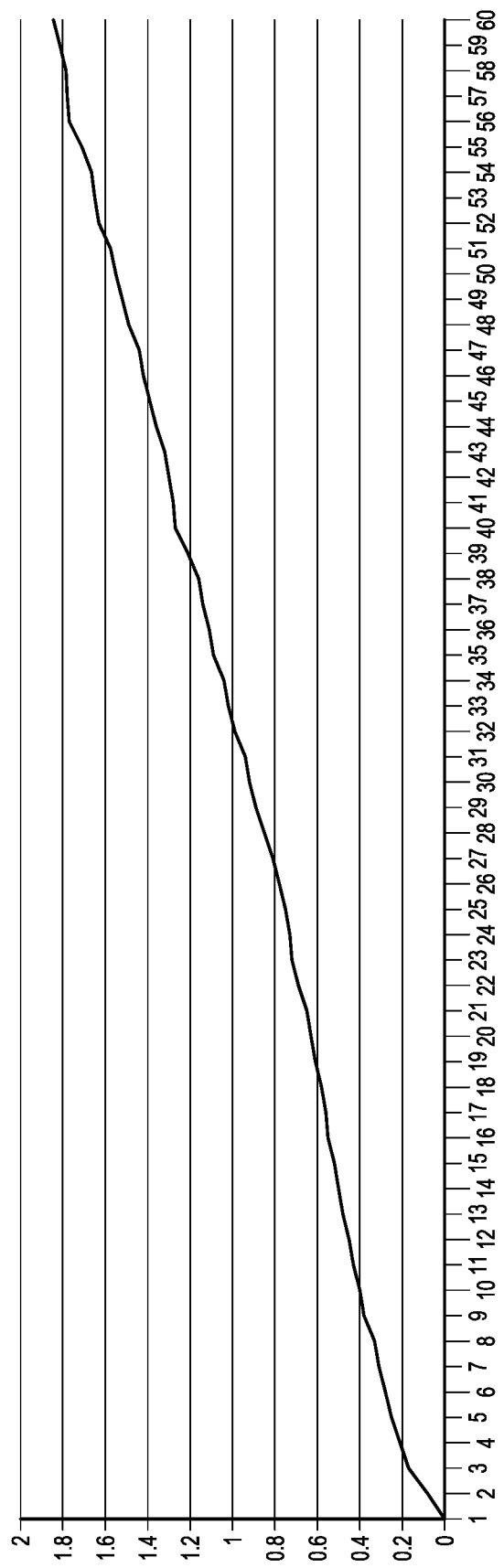
FIG. 11 is a graph plotting a lookup table after being calibrated in accordance with a preferred embodiment.

At Step 1106, a force meter is used to measure actual force being applied. In an embodiment, the force meter is a push/pull force meter. The direct measurement of force allows calibration of the LUT by comparing the displayed force magnitude F with the measured actual force. At Step 1108, the LUT is updated with a corrected force corresponding with the measured battery pack voltage BV. After Step 1108, Steps 1102-1106 are repeated for each successive voltage increment. In the embodiment depicted in accordance with the method 900, Steps 1102-1106 are repeated for every 3-volt increment. FIG. 11 is a graph plotting the LUT calculated by the method 1100 after all 3-volt increments had been updated.

FIG. 12 is a flow diagram showing a method 1200 of detecting force applied by a percussive massage device in accordance with a preferred embodiment. At Step 1202, current magnitude C of a battery pack is obtained. In an embodiment, current magnitude C is input into the microcontroller unit 701. At Step 1204, voltage magnitude BV of a battery pack is obtained. In an embodiment, voltage magnitude BV is input into the microcontroller unit 701. At Step 1206, power is calculated using the product of C and BV. In an embodiment, the microcontroller unit 701 is configured to calculate power by multiplying C and BV. At Step 1208, a lookup table is generated that correlates power magnitude P to force magnitude F. In an embodiment, the lookup table is generated using a method 1300 of generating a lookup table correlating power to force. For example, the power magnitude P may be expressed in watts. In an alternative embodiment, force magnitude F may be expressed in pounds of force or Newtons of force.

At Step 1210, the force magnitude F corresponding to power magnitude P is displayed on the percussive massage device with force meter 700. In an embodiment, a series of LED lights may be utilized to depict varying amounts of force as the force is being applied by the percussive massage device with force meter 700. Thus, as the amount of force magnitude F increases, more LEDs on the series of LED lights will be lit. Preferably, the series of LED lights consists of 12 LED lights.

FIG. 13 is a flow diagram showing a method 1300 of generating a lookup table correlating power to force. At Step 1302, a maximum magnitude of power, $F_{MAX}$, is determined. A theoretical maximum magnitude of power, however, is not a reasonable assumption if the total effective power may be calculated. Equation 1 may be utilized to determine Total Maximum Effective Power ($EP_{MAX}$).

$$\text{Total } EP_{max} = P_{MAX} \times \text{Total } EP \qquad \text{Equation 1:}$$

Equation 2 may be utilized to calculate Total EP, which is then input into Equation 1 above.

$$\text{Total } EP = EP_{BATTERY} \times EP_{PCBA} \times EP_{MOTOR} \qquad \text{Equation 2:}$$

where Total EP, $EP_{BATTERY}$, $EP_{PCBA}$, and $EP_{MOTOR}$ are all expressed in percentages, and where PCBA is a printed circuit board assembly.

In an embodiment, EP (Battery) is 85%, EP (PCBA) is 95%, and EP (Motor) is 75%. Thus, using Equation 2, Total EP is 85%*95%*75%=60.5625%.

In this embodiment, $P_{MAX}$ is calculated by multiplying the maximum voltage $V_{MAX}$ and the maximum amperage $C_{MAX}$ of the battery pack such as in Equation 3. $P_{MAX}$ is then input into Equation 1.

$$P_{MAX} = V_{MAX} \times C_{Max}$$

In this embodiment, $V_{MAX}$ is 16.8 volts and $C_{MAX}$ is 20 amperes. Thus, $P_{MAX}$ is 336 watts.

Turning back now to Equation 1, if $P_{MAX}$ is 336 watts and Total EP is 60.5625%, then Total $EP_{MAX}$ is 203 watts.

At Step 1304, a minimum amount of power $P_{MIN}$, is determined. It will be recognized by one of ordinary skill in the art that the power without any force being applied (i.e., no load) will be non-zero. Thus, $P_{MIN}$ of 12 watts is assumed. One of ordinary skill will also understand that the value of is equivalent to the rated power without load, which may be derived from $V_{MAX}$ and $C_{MIN}$.

At Step 1306, a maximum magnitude of force, $F_{MAX}$, is determined. The magnitude of $F_{MAX}$ may be determined by assessing the maximum desired force to apply using the percussive massage device with force meter 700. As an example, $F_{MAX}$ is 60 pounds of force.

At Step 1308, Total $EP_{MAX}$ is divided into equal increments. In an embodiment, Total $EP_{MAX}$ is divided in 3 watt increments per one pound of force, starting at $P_{MIN}$ (12 watts). It will be recognized by one of ordinary skill in the art that if $F_{MAX}$ is 60 pounds of force, the total desired force output of the percussive massage device with force meter 700, then 60 pounds of force correlates to 189 watts, within the calculated Total $EP_{MAX}$.

Figure 14:
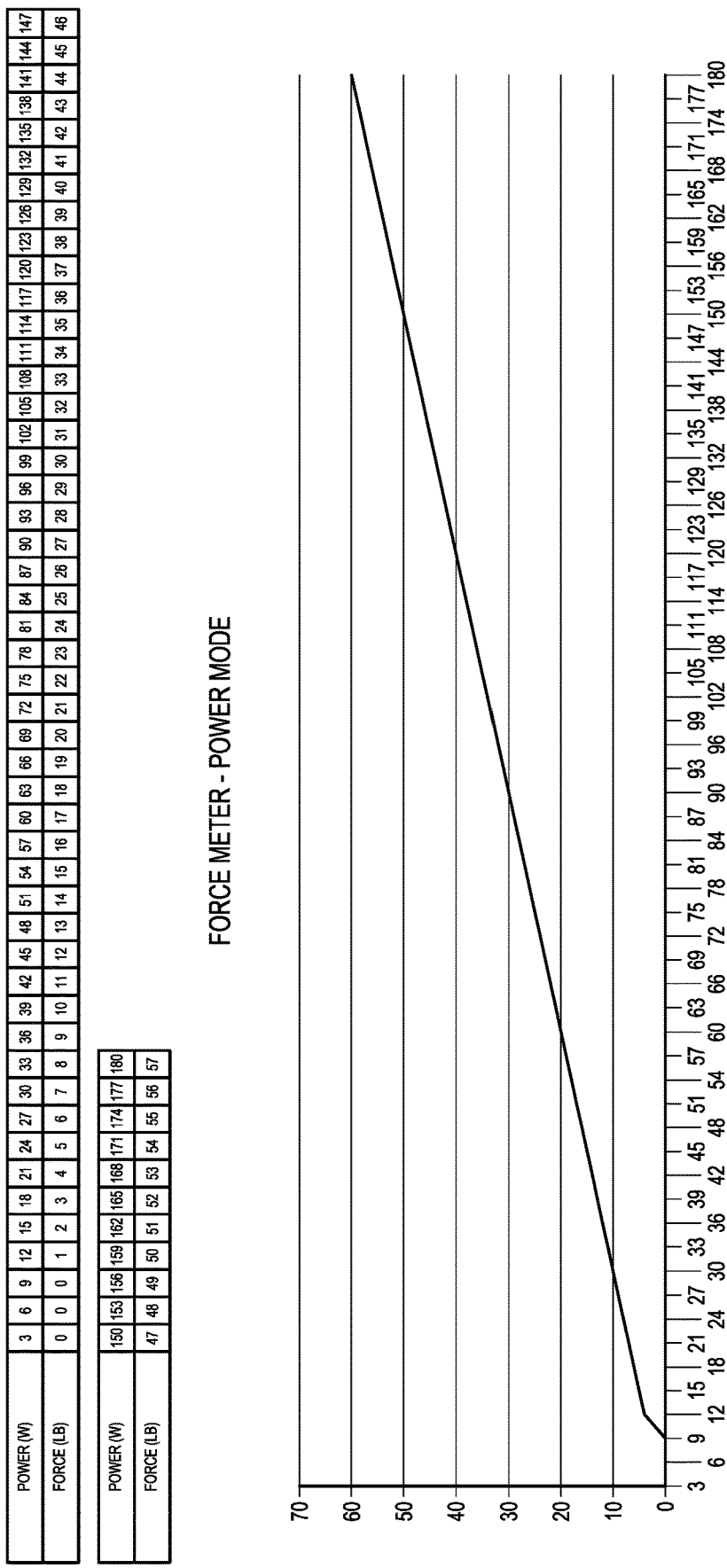
FIG. 14 is a graph plotting a lookup table for use by a method of detecting force of that was generated by correlating power to force in accordance with a preferred embodiment.

At Step 1310, a LUT is generated that correlates the increments of pounds of force with the increments of power in watts. This necessarily creates a linear relationship between force and voltage. FIG. 14 is a graph plotting the LUT for use by the method of detecting force of FIG. 12 that was generated using the specific example identified in FIG. 11. The graph depicts calculated force that was calculated using the method 1200.

Similarly to the method 900, a problem may arise in that the measured voltage of the battery pack at Step 1204 in the method 1200 is inaccurate. It may also be the case that as the percussive massage device with force meter 700 is used, the maximum available voltage degrades over time. In other words, the battery or battery pack voltage may decrease.

Figure 15:
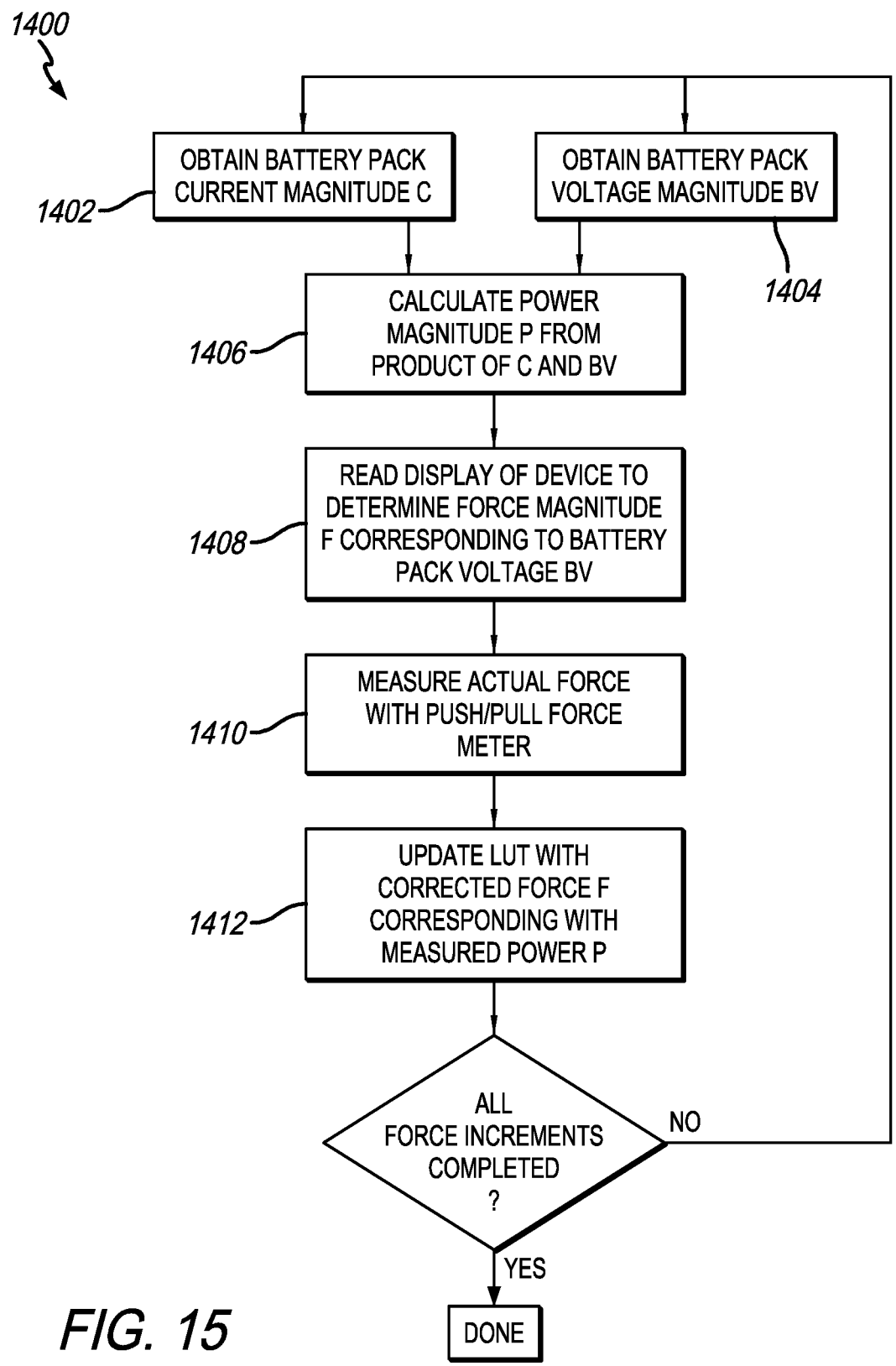
FIG. 15 is a flow diagram showing a method of calibrating a lookup table in accordance with a preferred embodiment.

FIG. 15 is a flow diagram showing a method 1400 of calibrating a LUT. The method 1100 may be performed after the method 900 or the method 1200, or entirely separately from the method 900 or the method 1200. At Step 1402, current magnitude C of a battery pack is obtained. In an embodiment, current magnitude C is input into the microcontroller unit 701.

At Step 1404, battery pack voltage BV is measured. In an embodiment, the measurement is done without applying any force from the percussive massage device with force meter 700. In an embodiment, the battery pack voltage BV is measured using an external voltage meter. In another embodiment, the battery pack and/or microcontroller unit 701 have embedded solutions for directly measuring battery pack voltage BV. At Step 1406, power is calculated using the product of C and BV. In an embodiment, the microcontroller unit 701 is configured to calculate power by multiplying C and BV.

Figure 16:
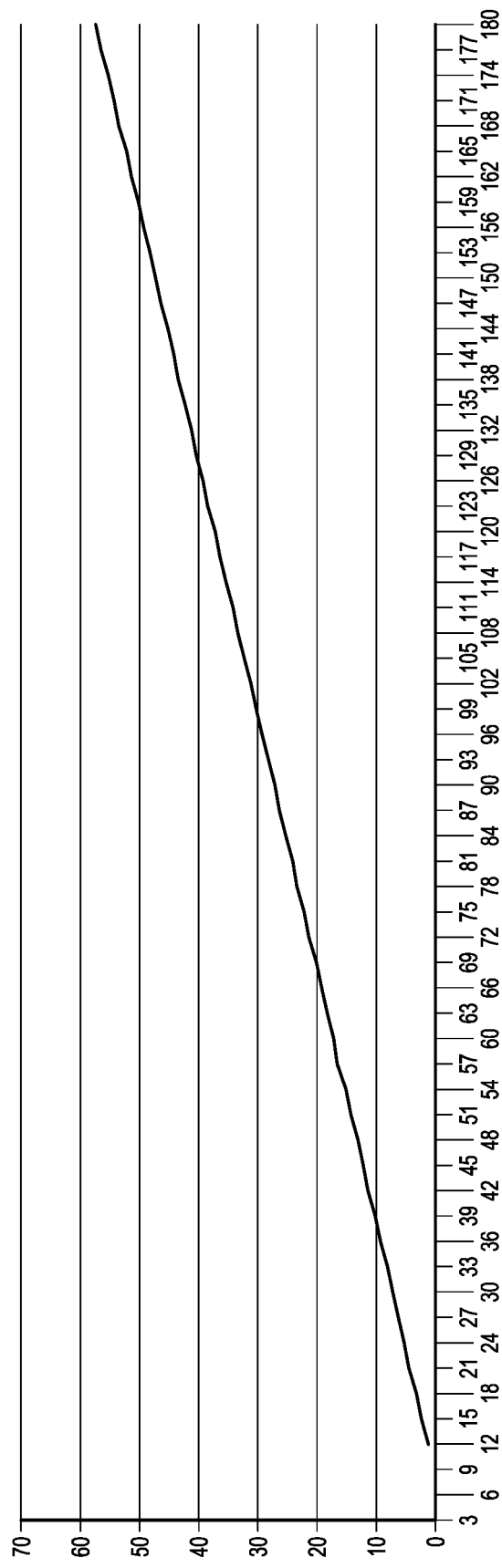
FIG. 16 is a graph plotting a lookup table after being calibrated in accordance with a preferred embodiment.

At Step 1408, the display on the percussive massage device with force meter 700 that displays the force magnitude F is read to determine the force magnitude F corresponding to the calculated power. At Step 1410, a force meter is used to measure actual force being applied. In an embodiment, the force meter is a push/pull force meter. The direct measurement of force allows calibration of the LUT by comparing the displayed force magnitude F with the measured actual force. At Step 1412, the LUT is updated with a corrected force corresponding with the measured power. After Step 1412, Steps 1402-1410 are repeated for each power or force increment. In the embodiment depicted in accordance with the method 900, Steps 1402-1410 are repeated for every 3-watt increment. FIG. 16 is a graph plotting the LUT calculated by the method 1400 after all 3-watt increments had been updated.

Figure 17:
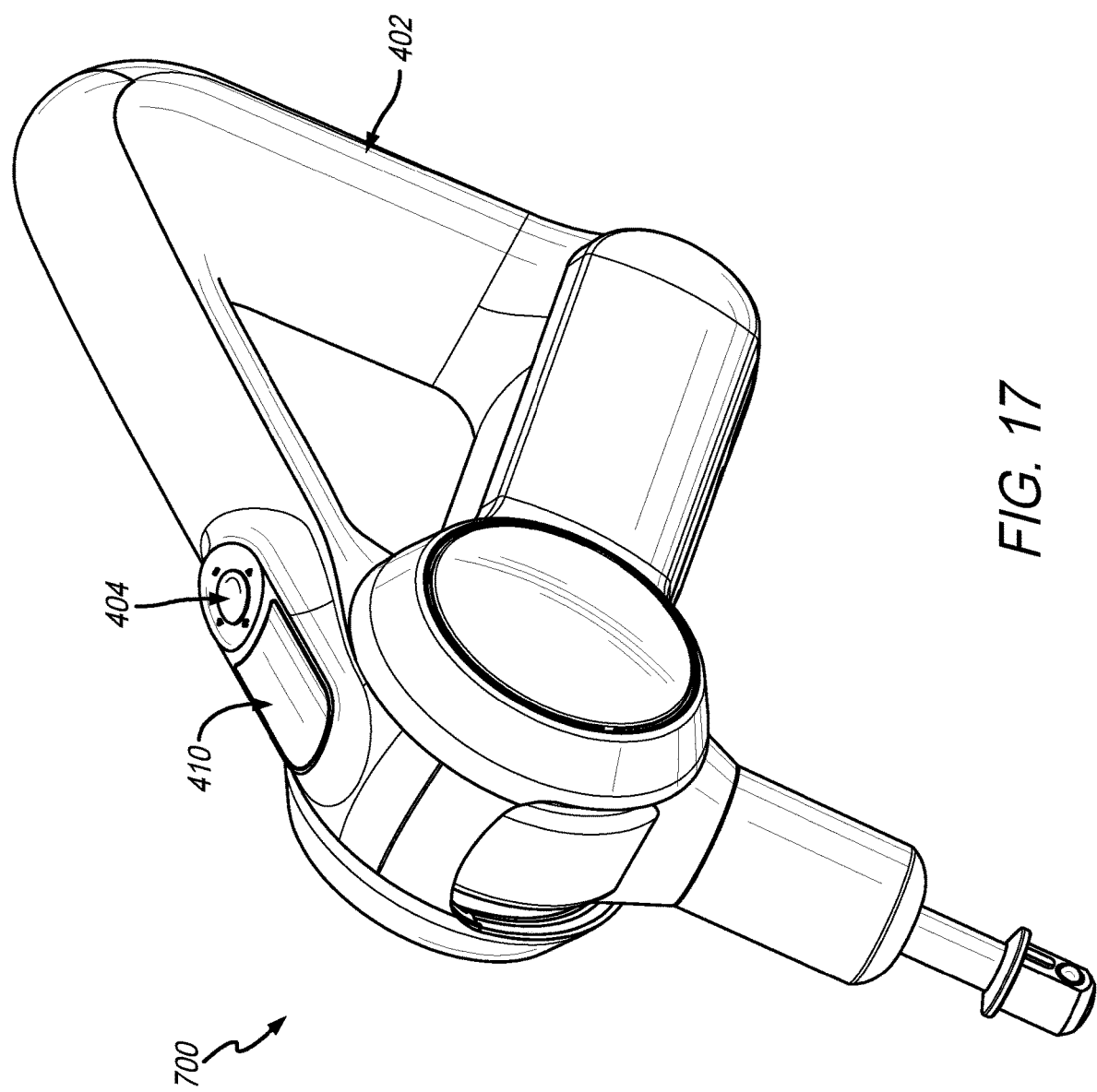
FIG. 17 is a perspective view of a percussive massage device in accordance with a preferred embodiment of the present invention.
Figure 18:
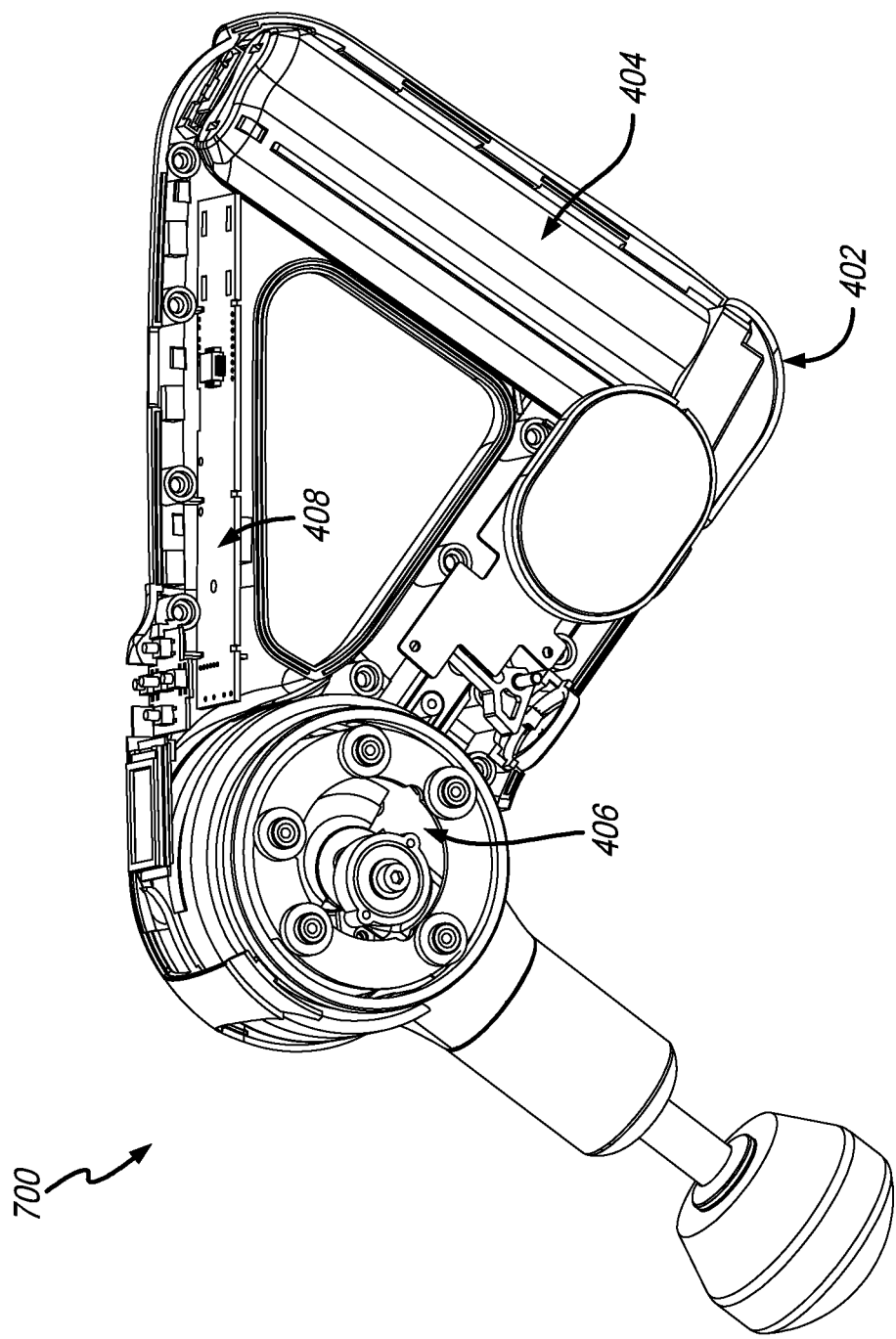
FIG. 18 is a perspective view of the percussive massage device of FIG. 17 with a portion of the housing removed.
Figure 19:
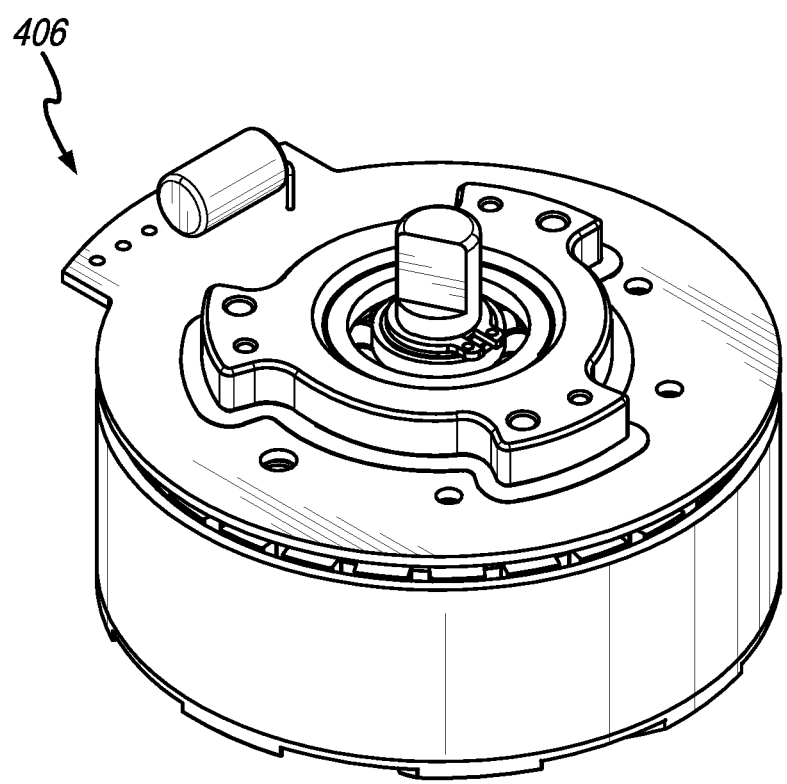
FIG. 19 is a perspective view of the motor.

FIGS. 17-19 show an exemplary percussive massage device with force meter 700 that embodies the features disclosed herein, and, in particular, in FIGS. 1-16. Generally, the percussive massage device with force meter 700 includes a housing 402, an electrical source or battery pack 404, a motor 406 positioned in the housing 402, and a switch 404 for activating the motor 406. The electronics (see printed circuit board 408 in FIG. 18) includes the controller that is configured to obtain a voltage of the motor, generate a lookup table correlating voltage to force applied by the percussive massage device, and display a force magnitude corresponding to the obtained voltage using the lookup table. The display can be screen 410.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A percussive massage device comprising:
   a housing,
   an electrical source,
   a motor positioned in the housing,
   a switch for activating the motor,
   an actuated output configured to reciprocate when the motor is activated, and
   a controller configured to obtain a voltage of the motor, generate a lookup table correlating voltage to force applied by the percussive massage device, and display a force magnitude corresponding to the obtained voltage using the lookup table, wherein the lookup table is generated by determining a maximum magnitude of force configured to be applied by the percussive massage device, determining a maximum magnitude of voltage configured to be applied to the percussive massage device from a power source, dividing the maximum magnitude of force into equal force increments, and dividing the maximum magnitude of voltage into equal voltage increments.

2. The percussive massage device of claim 1, wherein the electrical source comprises a battery pack.

3. The percussive massage device of claim 1, further comprising a display configured to depict an amount of force applied by the percussive massage device.

4. The percussive massage device of claim 3, wherein the display comprises a series of LEDs.

5. The percussive massage device of claim 1, further comprising an organic light-emitting diode screen.

6. The percussive massage device of claim 1, wherein the motor is a brushless direct-current (BLDC) motor.

7. The percussive massage device of claim 6, further comprising a voltage-sensing resistor electrically coupled to the BLDC motor and the controller.

8. The percussive massage device of claim 1, wherein the lookup table correlating voltage to force is linear.

9. The percussive massage device of claim 1, wherein an updated lookup table is generated by obtaining a maximum power source voltage of the percussive massage device, setting the maximum power source voltage to be the maximum magnitude of voltage, and dividing the maximum magnitude of voltage into equal voltage increments to generate a range of voltages, wherein the updated lookup table correlates voltage to force applied by the percussive massage device corresponding to the range of voltages determined by the maximum power source voltage.

10. The percussive massage device of claim 9, wherein a calibrated force magnitude corresponding to the maximum power source voltage using the updated lookup table is displayed.

11. The percussive massage device of claim 1, wherein an updated lookup table is generated by obtaining at least two power source voltages each corresponding to a magnitude of force, wherein the magnitude of force is determined from the displayed force magnitude, and measuring a magnitude of force exerted by the percussive massage device using an external force meter for each of the at least two power source voltages, wherein the updated lookup table correlates voltage to force applied by the percussive massage device corresponding to the measured magnitudes of force.

12. The percussive massage device of claim 11, wherein a calibrated force magnitude corresponding to the measured magnitudes of force using the updated lookup table is displayed.

13. The percussive massage device of claim 12, wherein the lookup table is updated for each magnitude of force capable of being displayed on the percussive massage device.

14. A percussive massage device comprising:
housing,
a battery pack,
a motor positioned in the housing,
a switch for activating the motor,
an actuated output configured to reciprocate when the motor is activated, and
a controller configured to obtain a current magnitude of the battery pack of the percussive massage device, obtain a voltage magnitude of the battery pack, determine a power magnitude using the current magnitude and voltage magnitude of the battery pack, generate a lookup table correlating power magnitude to force magnitude applied by the percussive massage device, and display a force magnitude corresponding to the obtained power magnitude using the lookup table.

15. The percussive massage device of claim 14, wherein the lookup table is generated by determining a maximum power magnitude to be input into the percussive massage device, determining a minimum power magnitude of the percussive massage device when no load is applied to the percussive massage device, determining a maximum force magnitude configured to be applied to the percussive massage device from a power source, dividing the maximum power magnitude into equal power increments, and dividing the maximum force magnitude into equal force increments.

16. The percussive massage device of claim 15, wherein the number of equal power increments and the number of equal force increments is the same.

17. The percussive massage device of claim 15, wherein the maximum power magnitude is a maximum effective power magnitude derived from a total effective power.

18. The percussive massage device of claim 15, wherein the lookup table is updated for each magnitude of force capable of being displayed on the percussive massage device.

19. The percussive massage device of claim 14, wherein an updated lookup table is generated by determining at least two power magnitudes using current and voltage measurements of the battery pack, each corresponding to a magnitude of force, wherein the magnitude of force is determined from the displayed force magnitude, and measuring a magnitude of force exerted by the percussive massage device using an external force meter for each of the at least two power magnitudes, wherein the updated lookup table correlates power to force applied by the percussive massage device corresponding to the measured magnitudes of force.

20. The percussive massage device of claim 14, wherein a calibrated force magnitude corresponding to the measured magnitudes of force using the updated lookup table is displayed.

* * * * *